United States Patent [19]
Maroschak

[11] 3,910,713
[45] Oct. 7, 1975

[54] METHOD FOR MAKING CORRUGATED PLASTIC TUBING

[76] Inventor: Ernest J. Maroschak, Box 878, Roseboro, N.C. 28382

[22] Filed: Sept. 1, 1972

[21] Appl. No.: 285,920

Related U.S. Application Data

[63] Continuation-in-part of Ser. Nos. 262,192, June 13, 1972, Pat. No. 3,819,778, and Ser. No. 278,003, Aug. 4, 1972, abandoned.

[52] U.S. Cl. .................... 408/1; 29/33 D; 83/15; 83/22; 83/54; 83/170; 83/660; 408/32; 408/35; 408/55; 425/71; 425/105; 425/290
[51] Int. Cl.² .................................. B29C 17/10
[58] Field of Search ............... 408/1, 32, 35, 44, 55; 29/33 T, 33 D; 83/15, 22, 54, 168, 169, 170, 660; 425/290, 296, 308, 445, 71, 72, 94, 105

[56] References Cited
UNITED STATES PATENTS

| | | | |
|---|---|---|---|
| 708,177 | 9/1902 | Sherman | 408/35 X |
| 1,740,029 | 12/1929 | Moomy | 425/71 X |
| 2,903,743 | 9/1959 | Lysobey | 425/105 |
| 3,069,763 | 12/1962 | Reynolds | 29/33 D X |
| 3,160,687 | 12/1964 | Andrews | 425/290 X |
| 3,524,245 | 8/1970 | Searing | 29/33 D X |
| 3,620,115 | 11/1971 | Zieg et al. | 83/660 X |

*Primary Examiner*—Donald R. Schran
*Assistant Examiner*—Z. R. Bilinsky
*Attorney, Agent, or Firm*—Parrott, Bell, Seltzer, Park & Gibson

[57] ABSTRACT

An apparatus and method for manufacturing corrugated plastic drainage tubing and which comprises an extruder having an extrusion die for extruding a smooth tube of hot plastic material, blow molding means positioned adjacent the extruder for forming annular corrugations in the tube, and a tube cooling chamber positioned adjacent the blow molding apparatus for cooling the tube. An aperture forming device is positioned adjacent the tube cooling chamber and is designed to form drainage apertures or slits in the tube. A tube cutting apparatus is positioned immediately downstream of the aperture forming device, and the cut lengths are then arranged to facilitate shipment or storage by means of either a lateral doffing apparatus for forming stacks of the cut lengths or a winding apparatus for forming a coiled roll.

6 Claims, 22 Drawing Figures

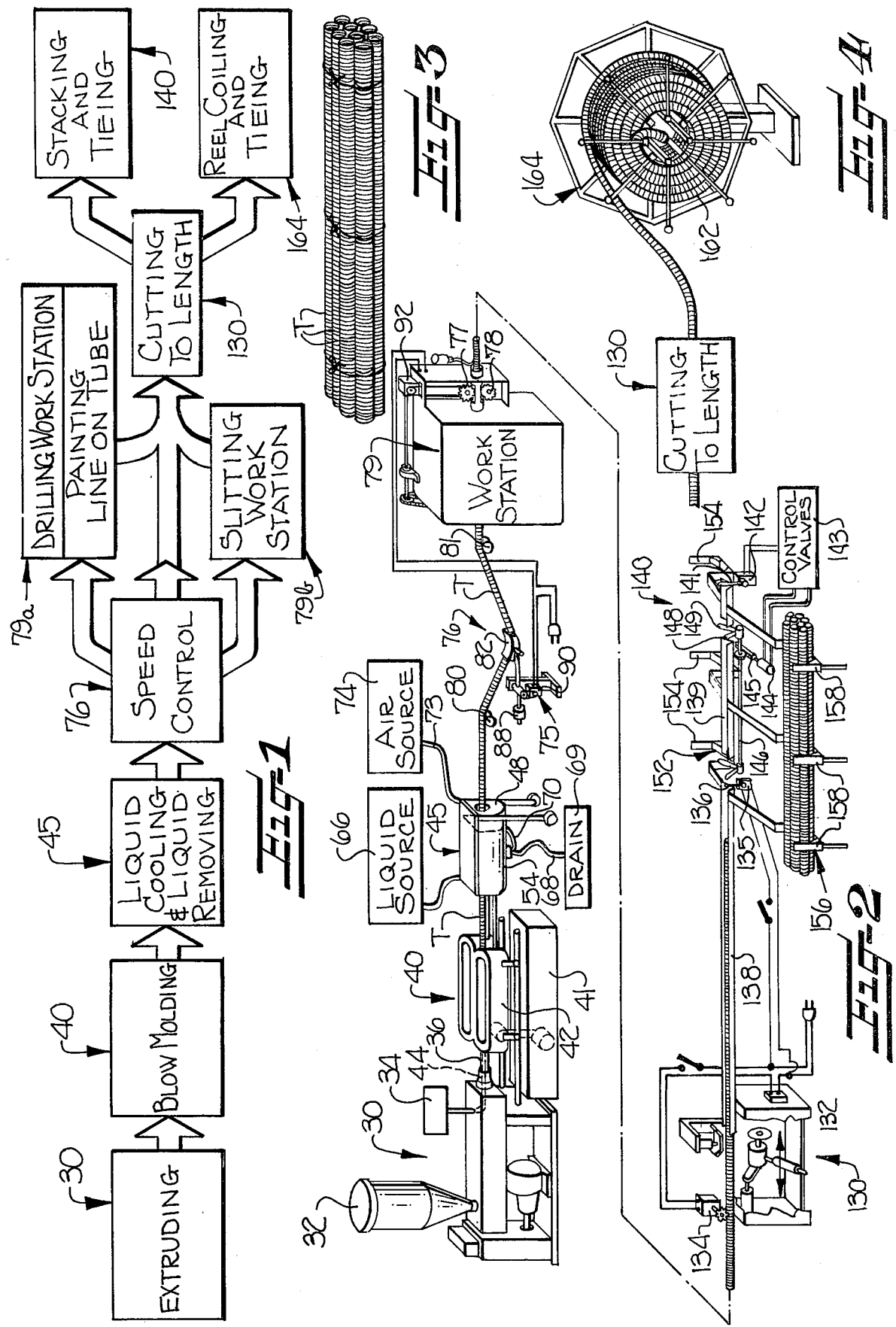

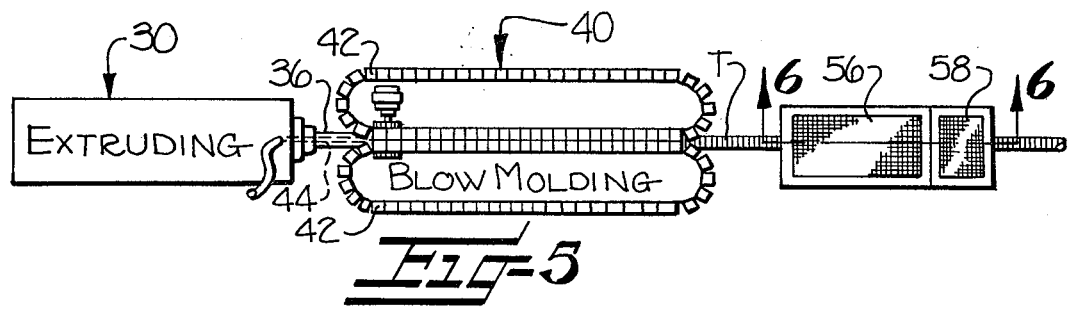
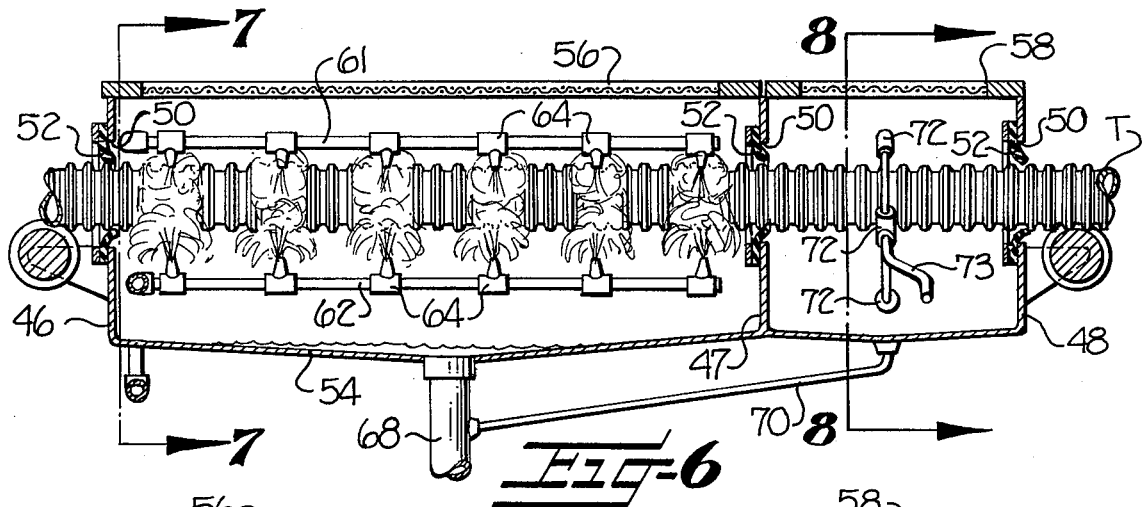
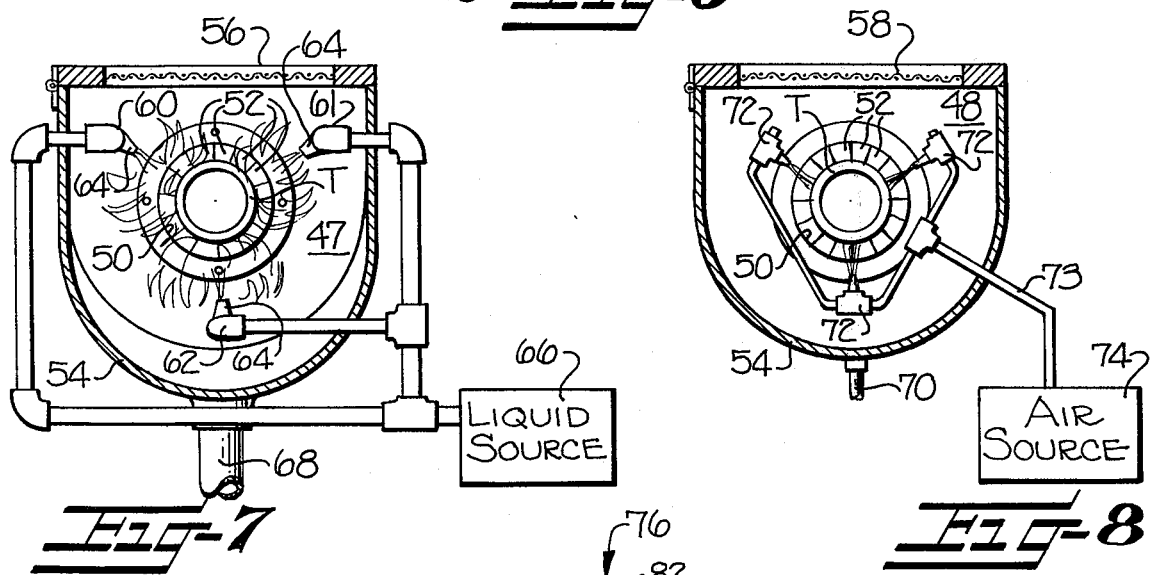
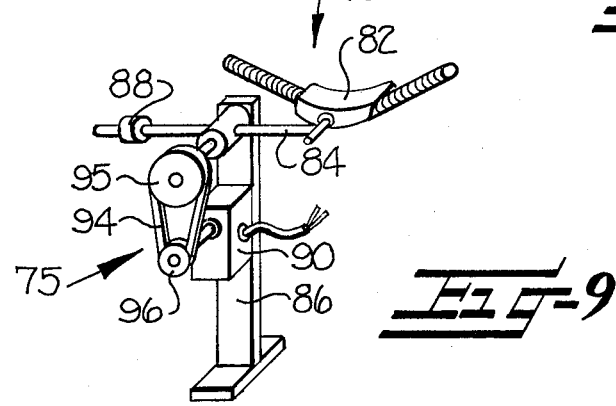

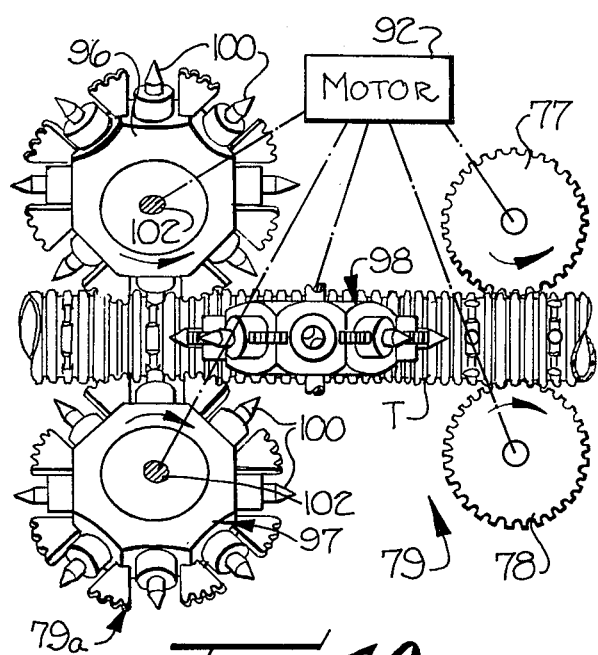
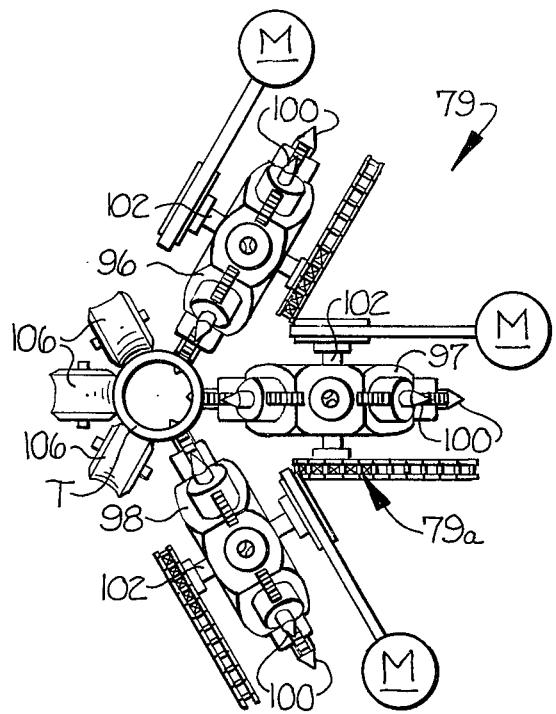
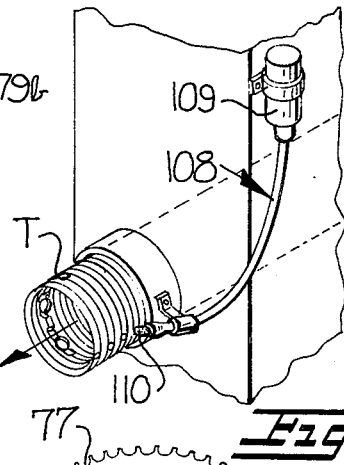
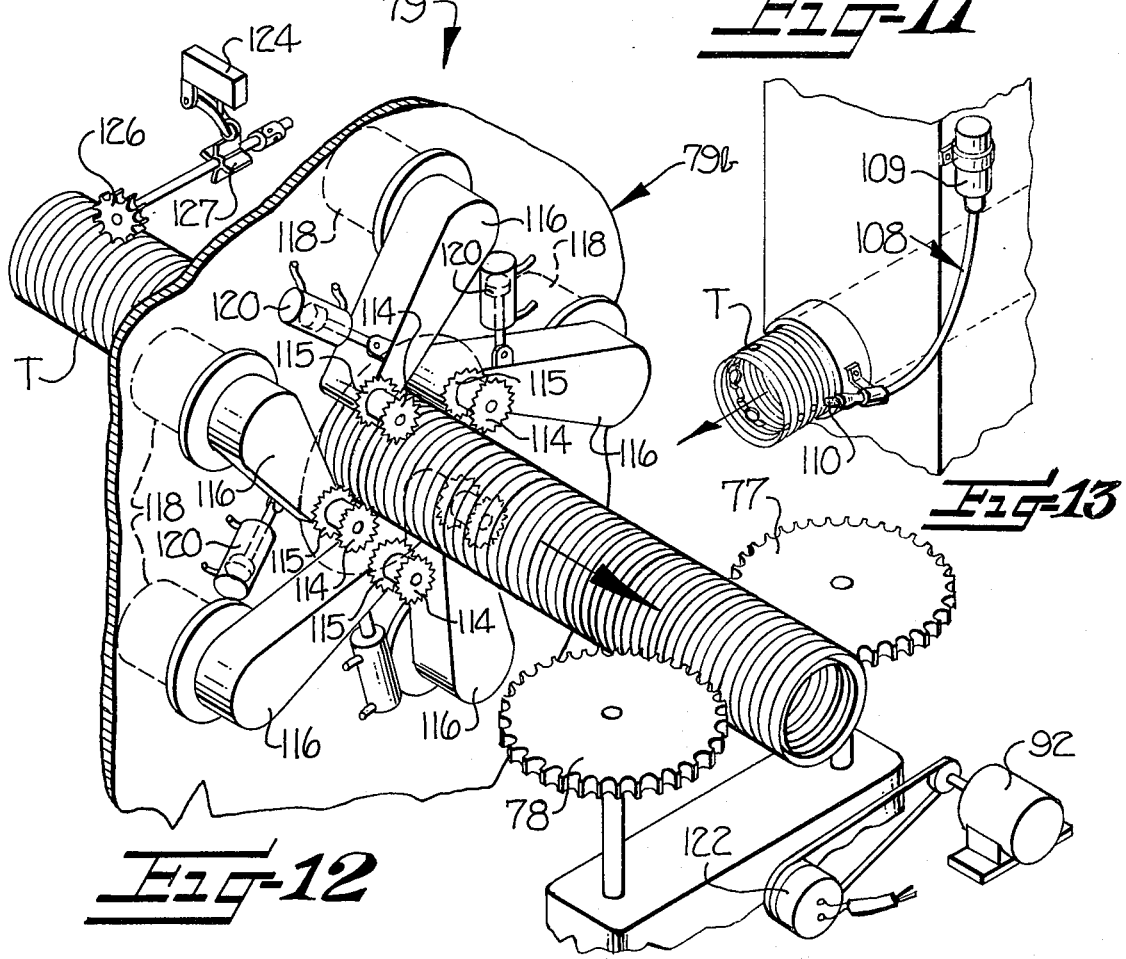

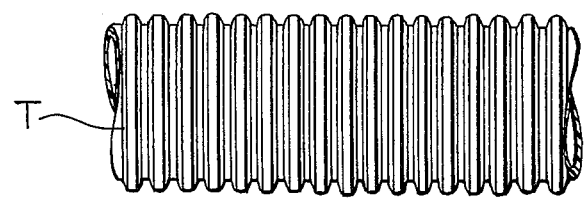
Fig-14
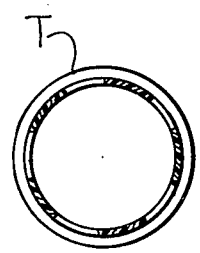
Fig-16
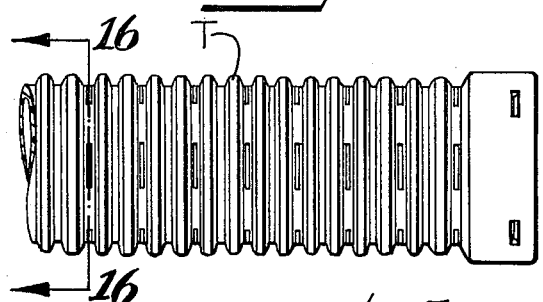
Fig-15
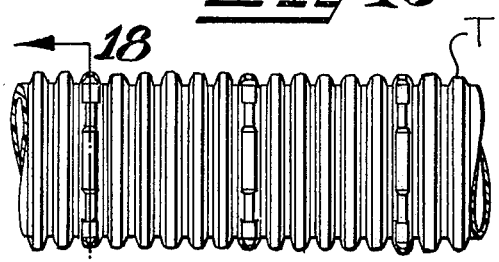
Fig-17
Fig-18
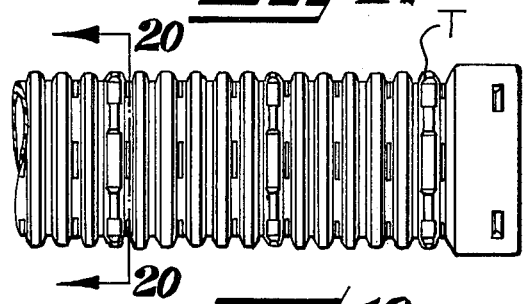
Fig-19
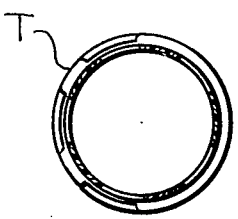
Fig-20
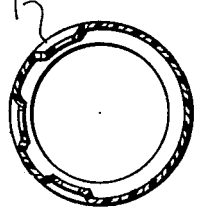
Fig-22
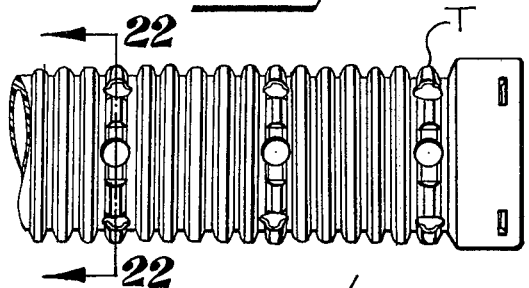
Fig-21

METHOD FOR MAKING CORRUGATED PLASTIC TUBING

The present application is a continuation-in-part of applications Ser. No. 262,192 filed June 13, 1972, now U.S. Pat. No. 3,819,778 and entitled METHOD OF MAKING AND PROCESSING CORRUGATED PLASTIC PIPE, and Ser. No. 278,003, filed Aug. 4, 1972, and entitled METHOD AND APPARATUS FOR RESHAPING ENDS OF TUBES TO FORM COUPLERS THEREON, now abandoned.

The present invention relates to an apparatus and method for manufacturing corrugated plastic tubing for use, for example, as drainage pipe, irrigation pipe, or in septic tank drainage fields and the like.

Corrugated plastic tubing is presently manufactured by a process wherein a smooth tube of hot plastic material is initially extruded, and the tube is then corrugated by passing the same into a blow molding apparatus comprising semitubular mold sections arranged for movement along a path of travel defining a horizontal tubular passageway. Pressurized air is introduced into the passageway to move the tube against the outline of the mold sections to form corrugations therein, and a plug is positioned within the passageway at the discharge end thereof to maintain the pressure therewithin.

Upon leaving the blow molding apparatus in the above process, the tube is at an elevated temperature and is thus easily deformed or stretched during subsequent handling. For example, if the tube is coiled while at an elevated temperature, the tube will assume the coiled configuration and "set" upon cooling making it difficult if not impossible to uncoil. Also, the elevated temperature of the tube makes it unsuitable for drilling or cutting drainage apertures therein since the hot plastic material tends to adhere to the drilling or cutting tool thereby rendering the tool ineffective.

In an attempt to alleviate the above problems, it has been proposed to convey the tube along a sinusoidal path to permit the same to be cooled by contact with the air after leaving the blow molding apparatus and prior to subsequent handling, or drilling or cutting the drainage apertures therein. However, such procedure not only requires a great deal of space but the movement of the tube along its sinusoidal path often results in the unacceptable degree of deformation during the cooling operation. It has also been proposed to run the production equipment at speeds below full capacity to reduce the overall temperature of the blow molding apparatus such that the tube exits therefrom at a somewhat lower temperature. This latter alternative however is obviously unacceptable since it reduces production efficiency.

It is accordingly an object of the present invention to provide an apparatus and method for forming an annularly corrugated plastic tube at a high rate of production, cooling the same, and subjecting the tube to further handling or processing, and without deforming or stretching the tube.

It is a further object of the present invention to provide an apparatus and method for cooling an advancing annularly corrugated plastic tube without deforming or stretching the tube and by a procedure which includes spraying a liquid coolant on all surfaces of the corrugated tube.

It is another object of the present invention to provide an apparatus and method for cooling an advancing tube as described above, and wherein the tube exiting from the cooling chamber is substantially dry so that the tube does not interfere with a subsequent aperture forming operation or other processing.

It is another object of the present invention to provide an apparatus and method for efficiently forming apertures in an advancing length of corrugated plastic tubing, cutting the advancing tube into suitable predetermined lengths, and arranging the cut lengths to facilitate shipment or storage.

These and other objects and advantages of the present invention are achieved in the embodiment illustrated herein by the provision of an apparatus which comprises an extruder having an extrusion die for extruding a smooth tube of hot plastic material, blow molding means positioned immediately adjacent the extruder for forming annular corrugations in the hot advancing tube, a tube cooling chamber positioned adjacent the blow molding means and adapted to spray the advancing tube with a liquid coolant to reduce the temperature thereof, and an aperture forming apparatus positioned immediately adjacent the tube cooling chamber. The apparatus also incorporates means for advancing the tube through the aperture forming apparatus at a speed correlated to the tension in the tube, and a cutting station is located downstream of the aperture forming apparatus to cut the advancing tube into predetermined lengths. The cut lengths are then arranged to facilitate storage or shipment by either a lateral doffing apparatus for forming stacks of horizontally directed cut tubes, or a winding apparatus for forming each cut length into a separate coiled roll.

Some of the objects and advantages of the invention having been stated, others will appear as the description proceeds, when taken in connection with the accompanying drawings, in which:

FIG. 1 is a block diagram illustrating the steps of a method embodying the present invention;

FIG. 2 is a schematic perspective view of an apparatus embodying the features of the present invention;

FIG. 3 is a perspective view of a tied bundle of plastic drainage tubes produced in accordance with the present invention;

FIG. 4 is a perspective view of a winding apparatus for producing a coiled roll of the plastic tube in accordance with the present invention;

FIG. 5 is a fragmentary schematic plan view of a portion of an apparatus embodying the present invention, and illustrating the extruder, the blow molding apparatus, and the tube cooling chamber;

FIG. 6 is an enlarged sectional side view of the cooling chamber taken substantially along the line 6—6 of FIG. 5;

FIG. 7 is a sectional end view showing a first zone of the cooling chamber and taken substantially along the line 7—7 of FIG. 6;

FIG. 8 is a sectional end view showing a second zone of the cooling chamber and taken substantially along the line 8—8 of FIG. 6;

FIG. 9 is a perspective view of a device for sensing the tension of the advancing tube and as employed in the apparatus of the present invention;

FIG. 10 is a partly schematic fragmentary side view of a turret drilling station for use in the present invention;

FIG. 11 is a partly schematic fragmentary end view of the turret drilling station shown in FIG. 10;

FIG. 12 is a partly schematic fragmentary perspective view of an aperture slitting station for use with the present invention;

FIG. 13 is a fragmentary perspective view of the exit end of the turret drilling station and illustrating a device for applying a longitudinal indicia line to the outer surface of the advancing tube;

FIG. 14 is a fragmentary side elevational view of one embodiment of a corrugated plastic tube produced in accordance with the present invention;

FIG. 15 is a fragmentary side elevational view of another embodiment of a corrugated plastic tube of the present invention and having cut slits in alternate valleys of the corrugations, the rows being equally spaced about the circumference of the tube, and with an integral coupler at one end thereof;

FIG. 16 is an end view taken substantially along the line 16—16 in FIG. 15;

FIG. 17 is a fragmentary side elevational view of still another embodiment of a corrugated plastic tube of the present invention and having three longitudinal rows of plateaus formed in each sixth rib, the plateaus lying at an elevation intermediate the periphery of the rib and valley portions of the corrugations;

FIG. 18 is an end view taken substantially along the line 18—18 in FIG. 17;

FIG. 19 is a side elevational view of a corrugated plastic tube having plateaus as shown in FIG. 17, and further having cut slits in alternate valleys of the corrugations, the rows being equally spaced about the circumference of the tube, and with an integral coupler at one end;

FIG. 20 is an end view taken substantially along the line 20—20 in FIG. 19;

FIG. 21 is a fragmentary side elevational view of a corrugated plastic tube having plateaus in the corrugations as shown in FIG. 17, and further having an aperture in each of the plateaus and an integral coupler at the end thereof;

FIG. 22 is an end view taken substantially along the line 22—22 in FIG. 21.

Referring more specifically to the drawings, a generally conventional extruder is shown at 30, the extruder including a hopper 32 for receiving plastic granules, and a source 34 of pressurized air or other gas for the purposes hereinafter further described. The extruder includes an extrusion die at 36 for extruding a smooth tube of hot plastic material.

A blow molding apparatus 40 is positioned immediately adjacent the extruder 30 and is adapted to receive the extruded tube of hot plastic material therefrom and form annular corrugations therein. The blow molding apparatus 40 is mounted on a fixed support 41, and includes two sets of cooperating substantially semitubular mold sections 42 arranged for successive movement along an endless path of travel such that cooperating pairs of mold sections define a horizontal tubular passageway (not specifically illustrated). Each mold section 42 has transverse semicircular internal alternating ribs and valleys with the ribs and valleys of one section of each pair cooperating with the ribs and valleys of the other section of the same pair to form annular ribs and valleys as the mold sections advance along the path of travel. A molding apparatus of this type is well known in the art and will therefore not be described further herein.

The source 34 of pressurized air communicates with the passageway formed by the mold sections via the tube 44 extending through the extruder 36. Thus as the smooth tubular plastic material exits from the extruder 36, the pressure within the passageway moves the tube of hot plastic material outwardly against the annular ribs and valleys of the mold sections to form annular corrugations therein. The term "annular corrugations" as used herein means not only corrugations in the form of individual circular ribs and valleys around the plastic tube and as shown for example in FIG. 14, but also includes spiral or helical ribs and valleys extending around and along the length of the corrugated tube. Also, some of the ribs of the corrugations may be interrupted at spaced intervals by plateaus which lie at a level intermediate the peripheries of the ribs and valleys of the corrugations, note for example FIG. 17. Generally, such plateaus facilitate the drilling of apertures or drainage holes through the tube as hereinafter further described.

A tube cooling chamber 45 is positioned adjacent the blow molding apparatus 40 and is adapted to receive the corrugated tube T exiting therefrom. The cooling chamber 45 comprises a housing which includes three horizontally spaced vertical walls 46, 47, and 48 defining a first zone between the walls 46 and 47 and a second zone between the walls 47 and 48. Each of the walls has an opening 50 for passage of the tube therethrough in a horizontal direction, and sealing means 52 in the form of a circular series of radially directed flexible flap members are carried by each of the walls about the associated openings for wipingly engaging the tube passing therethrough and for preventing substantial amounts of the liquid coolant from passing therethrough in the manner to become apparent. The housing further includes horizontally extending bottom and side walls defining a U-shaped trough 54 interconnecting the three vertical walls 46, 47, and 48. The trough 54 defines an open top, and a first cover 56 is hingedly connected along one edge of the trough for overlying the first zone, and a second independently operable cover 58 is hingedly connected to the same side edge of the trough to overlie the second zone. The two covers may be fabricated from a foraminous material, such as aluminum screening, to facilitate the escape of air therethrough.

The openings 50 in the three walls 46, 47, and 48 are horizontally aligned to define a central axis along which the tube T is adapted to travel. To rapidly cool the tube T, there is provided in the first zone three rows 60, 61, and 62 of spray nozzles extending horizontally along the length of the first zone, the three rows being positioned in an equally spaced circular arrangement about the central axis of the tube such that the liquid coolant is directed through the spray nozzles and thus contacts all of the surfaces of the corrugated tube passing therethrough. Thus in the illustrated embodiment, the three rows 60, 61, and 62 are spaced 120° from each other, and each row includes six individual spray nozzles 64.

Viewing FIG. 6, it will be observed that the lowermost row 62 of nozzles is directed to impinge upon the bottom of tube T. This is desirable since many tube corrugating machines are designed with a built-in cooling device along the upper surface, and this results in the tube produced by such equipment being much hotter along its bottom side. Thus by directing a stream of liquid coolant directly upon the bottom of the tube, the hot bottom side will be assured of adequate cooling.

The liquid coolant, which is typically water, is supplied to the nozzles 64 from a conventional source 66. After being discharged through the nozzles 64 and onto the tube T, the liquid coolant is collected in the bottom of the housing trough 54, and directed through the flexible drain hose 68 to the drain 69. A second drain hose 70 leads from the bottom of the second zone of the cooling chamber to collect any liquid coolant which is removed therein.

In the second zone of the cooling chamber, there are provided three jet nozzles 72 circularly arranged about the path of travel of the horizontally moving tube T. The nozzles 72 are connected by a suitable hose 73 to the pressure source 74 of gas, such as air, such that a high velocity current of air is directed through each of the nozzles to impinge upon all surfaces of the tube T to thereby effectively wipe the adhering residual liquid coolant from all exterior surfaces of the corrugated tube. In this regard, it will be appreciated that the flexible flap members 52 also serve to wipe some of the adhering residual liquid coolant from the tube as it passes through wall 47 from the first zone to the second zone of the housing. Also, it will be apparent that the foraminous cover 58 serves to permit the air introduced through the nozzles 72 to be dissipated to the atmosphere. Still further, it will be understood that the high velocity stream of pressurized air impinging upon the tube T will also serve to further cool the same.

Upon exiting from the tube cooling chamber, the tube T passes the tension sensing device 75 of the speed control 76. The tension sensing device 75 is operatively connected to the drive gears 77 and 78 positioned immediately downstream of the aperture forming work station 79, the drive gears matingly engaging the corrugations of the tube such that the tube may be advanced through the aperture forming work station at a controlled tension. More particularly, the tension sensing device 75 is positioned between a pair of fixed rollers 80, 81, and as best seen in FIG. 9, the device includes a slide 82 adapted to rest on the advancing tube T. The slide 82 is mounted at one end of a shaft 84, the shaft being pivotally mounted to the upright stand 86, and a counterbalance weight 88 is mounted at the opposite end of the shaft 84. A potentiometer 90 is carried on the stand 86 and is electrically connected to a motor 92 located at the aperture forming work station 79. The motor 92 is operatively connected to the drive gears 77 and 78 and the potentiometer 90 is operatively connected to the shaft 84 via the drive belt 94 and pulleys 95 and 96 so as to be controlled thereby. Thus the output of the potentiometer is varied in accordance with the position of the shaft. In operation, should the tension in the tube T increase, the slide will be lifted to effectively reduce the speed of the motor 92 and thereby decrease the speed of the advancing drive gears 77 and 78. Conversely, if the tube T becomes unduly slackened, the slide will move to a lowered position, and the potentiometer 90 will increase the speed of the motor 92 to in turn increase the speed of the gears 77 and 78 and thus the rate of advance of the tube.

As indicated in FIG. 1, the tube T may be fed by the speed control 76 through the aperture forming work station 79, or the tube may be fed directly to the cutting station 130 while bypassing the work station 79. Work station in FIGS. 10–11 and 13, or it may take the form of a slitting work station 79b as seen in FIG. 12.

The drilling work station 79a as seen in FIGS. 10–11 may include any suitable means for drilling one or more longitudinal rows of apertures in the tube being fed therethrough. In the illustrated embodiment, the drilling work station 79a comprises three turrets 96, 97, and 98 arranged to engage the tube along one side thereof, the turrets being angularly spaced approximately 60° from each other (note FIG. 11), and the turret 98 being spaced downstream from the other turrets. Each turret comprises a series of radially directed drill bits 100 extending radially outwardly from a central axis defined by the shaft 102, and an individual motor 104 for rotating each of the drill bits about their respective radial axes. The motor 92 serves to orbit the turrets, and thus the drill bits 100 about the central axis, at a speed wherein the working ends of the drill bits have an orbital speed with a component of longitudinal movement corresponding to the advance of the tube resulting from the rotation of the drive gears 77 and 78. Thus each successive drill bit moves into and out of the advancing tube to form apertures at predetermined points along the tube. As shown in FIG. 10, these predetermined points correspond to plateaus which have been formed in the ribs of the corrugated tube and which lie at an elevation intermediate the periphery of the ribs and valleys of the corrugations. As shown, there are three longitudinal rows of plateaus extending along the tube, and a hole is drilled through each of the plateaus.

The drilling work station 79a also includes three back-up rolls 106 as seen in FIG. 11, with each of the rolls being positioned immediately opposite one of the turrets. Further, the work station includes an indicia line applicator 108 as best seen in FIG. 13. More particularly, the applicator includes an ink or paint supply 109, and a felt tip 110 adapted to engage the outer exterior surface of the tube on the side generally opposite the side with the apertures therein. This line is useful during the placement of the tube in a septic tank drainage field or the like in order to verify that the apertures are directed downwardly.

It is customary to provide the corrugated tube with round drainage holes of the type produced by the above described drilling work station 79a for use in septic tank or other drainage fields. In the case of underground irrigation systems, it is customary to provide a circularly arranged series or rows or slits, usually in alternate valleys of the corrugations. Such rows or slits are produced by the slitting work station 79b which comprises six pair of cutting blades usually spaced about the circumference of the tube, the blades 114 and 115 of each pair being longitudinally spaced a distance corresponding to the distance between alternate valley portions of the tube corrugations. Each pair of blades is mounted at the end of a pivotal arm 116 which houses a suitable drive belt (not shown), and a motor 118 is mounted at the opposite end of each arm for operatively rotating the drive belt and cutting blades. An air cylinder 120 is operatively connected to each arm and is adapted to pivot the same such that the blades 114 and 115 move into and out of contact with the tube T.

The tube is intermittently advanced through the slitting work station 79b to define a dwell period between successive forward movements. More particularly, the motor 92 is in this embodiment operatively connected to the drive gears 77 and 78 across an electrically operated clutch 122 such that the gears rotate to advance the tube when the clutch is engaged, but rotation thereof is terminated when the clutch is disengaged. A switch 124 is located upstream of the drive gears and cutting blades to selectively disengage the clutch 122 upon the passage of a predetermined number of corrugations in the tube. In this regard, the switch 124 includes a counting wheel 126 which rests upon the tube and is adapted to mate with the corrugations so as to be rotated by the passage thereof. A follower 127 is connected to the wheel 126 and is adapted to actuate the switch 124 at the predetermined intervals. Thus in operation, the motor 92 is initially operatively connected to the drive gears to advance the tube, and upon passage of a predetermined number of corrugations in the advancing tube as measured by the wheel 126, the switch 124 is actuated to disengage the clutch 122 and terminate the advance of the tube. At this point, the air cylinders 120 are simultaneously actuated by suitable switching means (not shown) to advance the cutting blades into contact with the tube. The cutting blades are then retracted, and the clutch 122 engaged to again advance the tube.

Referring now to the tube cutting station 130, the motorized saw 132 thereof is actuated under the control of either the counting switch 134 or the sensing switch 135. The counting switch 134 includes a gear adapted to mate with the corrugations of the tube, and is usually employed to actuate the saw in the case of relatively long tube lengths of, for example, 100 feet or more and which are to be coiled.

The sensing switch 135 is used in the case of shorter cut lengths of, say 10 feet, and is positioned downstream a predetermined distance from the cutting station. The switch 135 includes a sensing arm 136 which normally protrudes upwardly through the tube guide trough 138. Upon the leading end of a tube T engaging and pushing the sensing arm 136 forwardly, the sensing switch is closed to actuate the motorized saw 132. The saw thereby severs each successive portion of the corrugated tube moving therethrough into a predetermined length. As is conventional, the motorized saw 132 is reciprocated to automatically move forward with the tube during the cutting operation and, upon the cutting being completed, the saw returns upstream to its original position ready for the next cutting operation. Since the operation and structure of such cutting saws are well known in the art, a further more detailed description thereof is deemed unnecessary.

As each successive cut length of the tube is advanced forwardly of the saw following the cutting operation, it is advanced onto a supporting trough 139 of the doffing and stacking apparatus 140. The supporting trough 139 is located in substantial alignment with the path of travel of the tube being delivered from the guide trough 138. As each successive cut length of the tube approaches the end of the supporting trough 139, it engages a finger 141 of a doffing switch 142. The doffing switch 142 is connected through suitable electrically operable control valves 143 to a double-acting cylinder or ram 144 which is connected, by a suitable rack and pinion arrangement 145, to a rocker shaft 146. Rocker shaft 146 is suitably journaled in the desired position and has two pair of upwardly diverging doffer arms 148, 149, with one pair being positioned adjacent each end of shaft 146. The switch 143 and control valves 143 are so arranged that, as the leading ends of alternate cut lengths of the tube engage the finger 141 and actuate the switch 142, the rocker shaft 146 is rotated in one direction to cause the arms 148 to move the corresponding cut lengths of tube T laterally into a first generally U-shaped hopper 152 defined by the laterally directed brackets 154. Upon the leading end of the next cut length engaging the finger 141, the rocker shaft 146 is rotated in the opposite direction to cause the arm 149 to move the cut length in the opposite lateral direction into a second U-shaped hopper 156 defined by the oppositely directed brackets 158 at the other side of the supporting trough 139. Obviously, the control valves 143 could be designed to first fill one hopper with the desired number of cut lengths, and then fill the other hopper. This latter mode of operation may be desirable in that the operator may be tying the cords around the stack previously deposited in one of the hoppers while the other hopper is being filled. In any event, the stacks of horizontally directed cut tubes are tied by a suitable cord or band 160 to form a bundle as shown in FIG. 3 to facilitate shipment or storage.

When it is desired to form the tube into a wound coil of substantial length, the sensing switch 135 of the cutting station is immobilized. The counting switch 134 is then employed for engaging the tube and detecting the linear length of the tube moving past the cutting station so as to actuate the saw 132 upon the desired length moving therethrough. Alternately, this measuring function could be conducted manually, but in either case, the length of tube is wound into a coiled roll 162 by the winding apparatus 164 as seen in FIG. 4 and is not acted upon by the lateral doffing and stacking apparatus 140. The coiled roll may also be tied if necessary to prevent unrolling of the tube.

While the above description is seen to fully describe the apparatus and method of the present invention, certain additional details may be obtained from the three applications being filed concurrently herewith. In particular, additional details of the cooling chamber 45 may be obtained from the application entitled APPARATUS AND METHOD FOR FABRICATING CORRUGATED PLASTIC TUBING; additional details of the turret drilling station 79a may be obtained from the application entited METHOD AND APPARATUS FOR DRILLING HOLES IN TUBES; and additional details of the doffing and stacking apparatus 140 may be obtained from the application entitled PIPE DOFFING AND BUNDLING APPARATUS AND METHOD.

In the drawings and specification, there has been set forth a preferred embodiment of the invention, and although specific terms are employed, they are used in a generic and descriptive means only and not for purposes of limitation.

That which is claimed is:

1. A method for cooling a longitudinally advancing hot annularly corrugated plastic tube following the molding thereof and for forming a plurality of spaced apertures along the length thereof such that the resulting tube is suitable for use as drainage tubing or the like, and comprising the steps of passing the advancing tube through a cooling chamber comprising first and second successively arranged zones while directing a plurality of streams of liquid coolant surroundingly arranged about the path of travel of the tube over the hot corrugated exterior surfaces of the portion of the tube disposed within the first zone, and while wiping the adhering residual coolant from the corrugated exterior surface of the portion of the tube disposed within said second zone by directing a high velocity current of gas upon the exterior of the tube whereby the tube is delivered from the second zone in a substantially dry condition, and drilling at least one longitudinal row of spaced apertures along the length of the thus cooled advancing tube by rotating a plurality of drill bits which are positioned in an equally spaced radial arrangement extending outwardly from a central axis, and orbiting the drill bits about the central axis such that the working ends of the drill bits have a component of longitudinal movement corresponding to the speed of movement of the tube and each successive drill bit moves into and out of the advancing tube to form apertures at predetermined points along the tube.

2. The method as defined in claim 1 including the further step of applying an indicia line longitudinally along the outside exterior surface of the tube on the side thereof generally opposite the row of apertures.

3. The method as defined in claim 1 including the further subsequent step of cutting the tube into predetermined lengths, and doffing the cut lengths to form a stack of cut lengths to facilitate shipment or storage.

4. The method as defined in claim 1 including the further subsequent step of cutting the tube into predetermined lengths, and winding each cut length into a coiled roll to facilitate shipment or storage.

5. A method for forming a plurality of spaced apertures along the length of a longitudinally advancing annularly corrugated plastic tube such that the resulting tube is suitable for use as drainage tubing or the like and for arranging the cut lengths to facilitate shipment or storage, and comprising the steps of drilling at least one longitudinal row of spaced apertures along the length of the advancing tube by rotating a plurality of drill bits which are positioned in an equally spaced radial arrangement extending outwardly from a central axis, and orbiting the drill bits about the central axis such that the working ends of the drill bits have a component of longitudinal movement corresponding to the speed of movement of the tube and each successive drill bit moves into and out of the advancing tube to form apertures at predetermined points along the tube, applying an indicia line along the outside exterior surface of the apertured tube on the side thereof diametrically opposite the row of apertures to facilitate placement of the tube in a septic tank field or the like with the row of apertures positioned lowermost, and cutting the advancing tube into predetermined lengths, and laterally doffing the cut lengths to form a stack of horizontally directed tubes to facilitate shipment or storage thereof.

6. The method as defined in claim 5 including the further subsequent step of tying the stack of horizontally directed tubes to form a unitary bundle of the same.

* * * * *

UNITED STATES PATENT OFFICE
CERTIFICATE OF CORRECTION

PATENT NO. : 3,910,713
DATED : October 7, 1975
INVENTOR(S) : Ernest J. Maroschak It is certified that error appears in the above-identified patent and that said Letters Patent are hereby corrected as shown below:

Column 6, Line 50, "or" should be --of--; Line 52, "usually" should be --equally--. Column 8, Line 55, "means" should be --sense--

Signed and Sealed this sixth Day of January 1976

[SEAL]

Attest:

RUTH C. MASON
Attesting Officer

C. MARSHALL DANN
Commissioner of Patents and Trademarks